Figure 1:
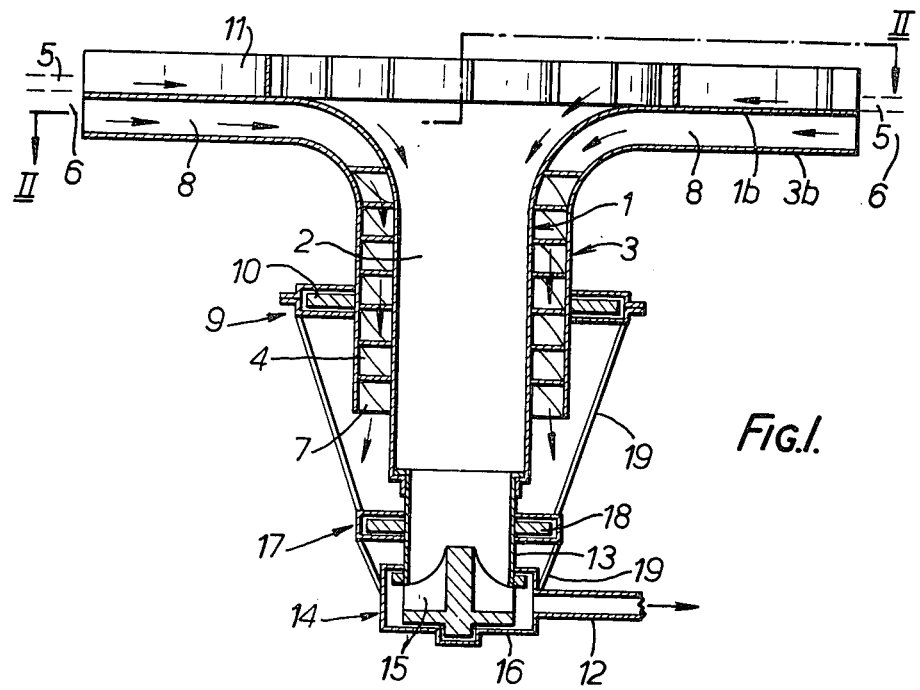

United States Patent [19]

Fox

[11] 4,265,758
[45] May 5, 1981

[54] COLLECTION OF A SURFACE LAYER OF LIQUID

[76] Inventor: Charles J. Fox, Hesley Cottage, Selbourne, Hampshire, England

[21] Appl. No.: 90,974

[22] Filed: Nov. 5, 1979

[51] Int. Cl.³ .............................................. E02B 15/04
[52] U.S. Cl. ................................. 210/242.3; 210/923; 210/512.1
[58] Field of Search .......... 210/83, 242, 512, DIG. 25

[56] References Cited

U.S. PATENT DOCUMENTS

| 3,741,391 | 6/1973 | Donsbarh | 210/242 |
|---|---|---|---|
| 3,753,496 | 8/1973 | Boyd | 210/242 S |
| 3,753,497 | 8/1973 | Hoffman | 210/242 |
| 3,800,951 | 4/1974 | Mourlm et al. | 210/242 S |
| 3,810,546 | 5/1974 | Oxenhem | 210/242 |
| 3,853,767 | 12/1974 | Mohn | 210/242 S |
| 4,111,809 | 9/1978 | Pichm | 210/242 |

FOREIGN PATENT DOCUMENTS

| 1062407 | 3/1967 | United Kingdom . |
|---|---|---|
| 1207154 | 9/1970 | United Kingdom . |
| 1258894 | 12/1971 | United Kingdom . |
| 1274387 | 5/1972 | United Kingdom . |
| 1371993 | 10/1974 | United Kingdom . |
| 1379148 | 1/1975 | United Kingdom . |
| 1515660 | 6/1978 | United Kingdom . |

Primary Examiner—Theodore A. Granger
Attorney, Agent, or Firm—Scrivener, Clarke, Scrivener and Johnson

[57] ABSTRACT

Apparatus for collecting the surface layer of a body of liquid, e.g. a layer of oil on water comprises a first member defining a central passage which is upwardly open and is arranged in use with the opening at the level of the interface between the surface layer of liquid and the underlying layer, and a second member which defines with the first member an annular passage surrounding the central passage and provided with vanes which form the rotor of an axial pump when the two members are rotated about the axis of the central passage. This rotation causes the layer of liquid underlying the surface layer to be drawn towards the apparatus and downwardly through the annular passage to draw the surface layer of liquid into the central passage. Liquid in the central passage is pumped therefrom to a reservoir.

18 Claims, 2 Drawing Figures

COLLECTION OF A SURFACE LAYER OF LIQUID

The present invention relates to the collection of a surface layer on a body of liquid and is particularly but not exclusively applicable to the collection of a layer of oil on the surface of a body of water. There are at present essentially two methods of removing an oil layer from the surface of a body of water and these are chemically, by dispersing the oil using chemicals, and mechanically by collecting the surface layer of oil. At present the most effective method is by the use of chemicals but it is thought that the chemicals do as much, if not more, damage ecologically than does the oil layer itself. It is consequently advantageous to collect the oil mechanically and in such a condition that it can be re-used, particularly with the increasing price of oil.

According to one aspect of the present invention there is provided an apparatus for collecting the surface layer of a body of liquid, the apparatus comprising a body defining a passage having one end open, the other end being adapted for connection to pump means for removing liquid in the passage, the body being adapted in use to be positioned in a body of liquid with the open end of the passage level with the interface between the layer to be collected and the underlying layers of liquid, and drive means for causing the surface layers of liquid to flow towards the open end of the passage.

The body preferably includes a generally planar flange surrounding the open end of the passage, the flange being in use arranged to lie in the plane of the interface so that the layer to be collected flows over the flange into the passage.

The drive means for causing the surface layers of the liquid to flow towards the open end of the passage may comprise means defining an annular passage surrounding the one passage and pump means causing liquid to flow down the annular passage. The apparatus is arranged so that the liquid flowing down the annular passage is constituted by the layer of liquid underlying the surface layer of liquid to be collected, which is thereby drawn towards the apparatus.

The drive means may create a whirling flow of liquid down the annular passage, the central passage having the general shape of the cavity created by a vortex in a body of liquid.

The body of the apparatus may comprise a first generally cylindrical member having a radially extending flange at one end and defining the central passage and a second correspondingly shaped member surrounding the first member and defining an annular passage therebetween. The other end of the first member is provided with or connected to a pump for removing liquid flowing into the central passage. The annular passage between the two members is open at both ends and provided with a pump for causing liquid to flow therealong.

Preferably the apparatus is arranged to have a specific gravity in use such that it will float with the flange of the first member level with the interface between the surface layer of liquid to be collected and the underlying layers of liquid.

According to another aspect of the present invention there is provided a method of collecting the surface layer of a body of liquid comprising creating a vortex in the liquid and collecting and removing the surface layer of the liquid forming the said vortex.

According to a further aspect of the present invention there is provided a method of collecting the surface layer of a body of liquid comprising creating a vertically extending cavity in the liquid, collecting and removing the surface layer of the liquid defining the cavity and causing the liquid underlying the surface layer to flow towards the cavity to draw the surface layer of liquid into the cavity.

Figure 2:
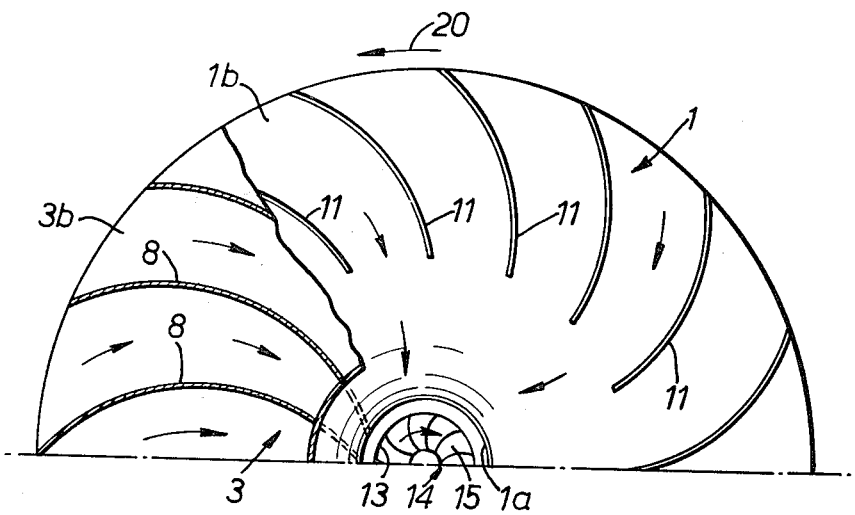

Further features of the present invention will become apparent from the following description of an embodiment thereof, given by way of example only, with reference to the accompanying drawings, in which:

FIG. 1 is a diagrammatic axial section through an embodiment of apparatus according to the present invention; and FIG. 2 is a section on the line II—II of FIG. 1.

The apparatus shown in the drawings comprises a first member 1 defining a passage 2 therethrough, the member 1 having a cylindrical part 1a provided with a generally radially extending flange 1b at one end. Surrounding and coaxial with the member 1 is a second member 3 defining with the member 1 an annular passage 4. The member 3 comprises a generally cylindrical part 3a and a radially extending flange 3b underlying the flange 1b. The flanges 1b, 3b merge with the parts 1a, 3a by radiused portions so that the members 1, 3 generally have the shape of a vortex created in a body of liquid.

In use, the apparatus is placed with the flange 1b in the plane of the interface between the surface layer 5 of liquid to be collected, e.g. oil, and the underlying layers 6 of liquid, e.g. water, so that the oil flows over the flange 1b and into the passage 2, from which it is removed, and water flows through the annular passage 4 and exits through the open lower end 7 thereof.

Oil and water is caused to flow to and through the apparatus by providing means for driving water through the annular passage 4 to cause a positive flow of water towards the apparatus and therefore a positive flow of the surface layer 5 to be collected. The lower end of the passage 2 is connected to or, as shown, provided with pump means for removing liquid therefrom.

As shown impellor vanes 8 are provided between the members 1, 3 in the annular passage 4 which are arranged to constitute an axial pump between the parts 1a, 3a and to constitute liquid collecting vanes between the flanges 1b, 3b. The vanes 8 are fixed to the members 1 and 3 which are rotated about the axis of passage 2. As shown the members 1, 3 are rotated by an air driven impulse turbine 9 whose blades 10 are fixed to or made integral with the member 3. It will be appreciated that the members 1, 3 may be driven in rotation by other means which may be pneumatic, hydraulic or electric.

Vanes 11 may also be provided on the surface of flange 1b to assist flow of oil into the passage 2. Oil is removed from the lower end of the passage along a pipe 12 by a pump connected to that passage or, as shown, by a pump provided at the lower end of passage 2. As shown part 1a of member 1 is extended by a cylindrical member 13 which is connected to member 1 by a fluid tight connection permitting relative angular rotation between the parts 1 and 13. At the lower end of member 13 there is a radial impellor pump 14. As shown the blades 15 of the pump 14 are fixed to or formed integrally with member 13 for rotation therewith and the casing 16 is connected to member 13 by a fluid tight coupling permitting relative rotation therebetween. The member 13 and therefore the blades 15 are rotated by a motor 17 which may, as shown, be an air driven impulse turbine the blades 18 of which are fixed to or formed integrally with member 13.

To prevent rotation of the casings of the motors 9 and 17 and of the pump 14, they may be connected by stays 19, the motors 9, 17 preferably being rotated in opposite directions to reduce the stresses in the stays 19.

In operation of the above described apparatus, the members 1, 3 are rotated by motor 9 in the direction of arrow 20 in FIG. 2. This causes the underlying layers 6 of water to flow down the annular passage 4 and thereby draws the surface layer 5 of oil into the apparatus. This surface layer flows over the surface of flange 1b and into passage 2 and is driven therefrom by the pump 14 along outlet pipe 12. Pipe 12 is connected to means for separating the oil from the water which is inevitably also taken into the apparatus, such separating means being for example a settling tank or centrifuge. The separating means may be provided on a vessel which also provides the pneumatic power for the motors 9 and 17.

The apparatus is advantageously designed so that in use with a preset level of liquid in passage 2 the apparatus will float with flange 1b at the interface between the surface layer to be collected and the underlying layers. The apparatus may then be supported from the vessel by stays 21 for example connected to the casing of the motor 9 so as to permit vertical movement of the apparatus but to restrain the apparatus against horizontal movement. The level of liquid in passage 2 can be maintained constant by controlling the motors 9 and 17 to increase or reduce the flow of liquid into and from the passage 2. To facilitate control a level detector may be provided at the required level to provide a signal in the vessel indicating when the level is too high or too low. Additional buoyancy control means (not shown) may also be provided to assist in controlling the level of the apparatus in the liquid and for use when starting and stopping the apparatus.

The members 1, 3, 13 and 15 may be moulded or otherwise made of a suitable oil resistant plastics material or fibre glass. The casings of the pump 14 and turbines 9 and 17 may be made of similar materials or of metal. The members 1, 3 may, for example, be made of neoprene or a synthetic rubber so that the flanges 1b, 3b are flexible.

In a preferred embodiment the flanges 1b, 3b, have an outside diameter of 366 cms and the passage 2 has a diameter of 61 cms.

There is thus provided an apparatus for collecting the surface layer of a body of liquid which, in its preferred form, produces an artificial vortex in the body of liquid and separates the surface layer in the vortex from the underlying layers of the liquid. More generally, the apparatus creates a cavity in the body of liquid and draws the surface layer of the liquid into the cavity by driving the underlying layers of the liquid down the sides of the cavity.

What is claimed is:

1. Apparatus for collecting the surface layer of a body of liquid, said apparatus comprising a buoyant body for floating in the liquid at a predetermined level therein, said body having a central passage for receiving the surface layer and having an axis which is substantially vertical and an upper end and a lower end, said upper end being open and lying in a plane substantially at the interface between the surface layer and the underlying layers of liquid and said lower end being connected to the inlet of first pump means for removing liquid therefrom, said body also having an annular passage for receiving liquid underlying the surface layer, said annular passage surrounding and being coaxial with said central passage and having an upper end and a lower end, said ends of said annular passage being open and said upper end lying in a plane below the interface between the surface layer and underlying layers, second pump means in said annular passage for driving liquid through said passage from the upper end to the lower end, and means connected to the outlet of said first pump means for receiving the liquid removed thereby from said central passage the plane of the upper end of said central passage being positioned relative to said interface that upon operation of said first pump means substantially only surface layer enters such central passage, the plane of the upper end of said annular passage being positioned relative to said interface that upon operation of said second pump means substantially only the underlying layer of liquid enters said annular passage.

2. Apparatus as claimed in claim 1, wherein said body comprises a first generally planar flange surrounding and connected to said upper end of the said central passage, said flange being arranged so that in use it will lie in the plane of said interface so that said surface layer to be collected will flow over said flange and into said first passage.

3. Apparatus as claimed in claim 2, wherein said flange is provided with upwardly projecting vanes of arcuate shape for guiding the surface layer of liquid into said first passage.

4. Apparatus as claimed in claim 3, wherein said first flange is provided with downwardly projecting vanes which are arcuate in shape and correspond to said upwardly projecting vanes, said downwardly projecting vanes extending into the annular passage surrounding said first passage to form the rotor of an axial pump constituting said second pump means, means being provided for rotating said body about the axis of said central passage.

5. Apparatus as claimed in claim 4, wherein said body comprises a second flange underlying said first flange and connected to said upper end of said annular passage to guide liquid into said annular passage, said downwardly projecting vanes being connected to said second flange, and the flanges together forming a passage for liquid flowing to said annular passage.

6. Apparatus as claimed in claim 5, wherein said central flange and said first passage and said second flange and said annular passage each have substantially the shape of a vortex created in liquid.

7. Apparatus as claimed in claim 4, wherein said first pump means connected to said lower end of said central passage comprises a radial pump comprising a rotor rotatable about the axis of said central passage and in the opposite direction to the direction of rotation of said body.

8. Apparatus as claimed in claim 7, wherein said rotor of said pump is fast with a member defining a passage in extension of said central passage but which is rotatable relative to said body.

9. Apparatus as claimed in claim 1, wherein said pump means include stators which are connected together by a framework of the apparatus.

10. Apparatus as claimed in claim 1, wherein said apparatus is adapted so that it will float at a predetermined position relative to the surface of the liquid with a predetermined level of liquid in said central passage, and means are provided for detecting the level of liquid in said first passage for use in controlling said pump means.

11. Apparatus as claimed in claim 1, including adjustable buoyancy means for use in adjusting the position of said apparatus relative to the surface of the liquid.

12. Apparatus for collecting the surface layer of a body of liquid, said apparatus comprising a buoyant body for floating in the liquid at a predetermined level therein, said body defining a central passage for receiving the surface layer and having an axis which is substantially vertical and an upper end and a lower end, said upper end being open, a first generally planar flange surrounding and connected to said upper end and lying in a plane substantially at the interface between the surface layer and underlying layers, an annular passage for receiving liquid underlying the surface layer surrounding and coaxial with said central passage and having an upper end and a lower end, and a second generally planar flange surrounding and connected to said upper end of said annular passage and underlying said first flange, said lower end of said annular passage being open, vane means extending in said annular passage to form the rotor of an axial pump for driving liquid through said annular passage from said upper end to said lower end thereof, means for rotating said body about said axis of said central passage, and pump means connected to the lower end of said central passage for removing liquid therefrom.

13. Apparatus as claimed in claim 12, wherein said pump means comprises a rotor rotatable about the axis of said central passage in a direction opposite to the direction of rotation of said body.

14. Apparatus as claimed in claim 12, wherein said vane means in said annular passage extend helical thereof and extend into the space between said first and second flanges.

15. Apparatus as claimed in claim 14, wherein said first flange is provided with upwardly projecting arcuate vanes for guiding liquid into said central passage.

16. Apparatus as claimed in claim 12, wherein said rotor of said pump means is fast with a member defining a passage in extension of said central passage and which is rotatable relative to said body.

17. Apparatus as claimed in claim 12, including liquid level detecting means for detecting the level of liquid in said central passage, and means connecting said liquid level detecting means to at least one of said axial pump and said pump means for controlling said at least one of said axial pump and said pump means to control the level at which said apparatus floats.

18. Apparatus as in claim 12, wherein said first and second flanges are substantially radially co-extensive with each other.

* * * * *